(12) United States Patent
Baker et al.

(10) Patent No.: US 9,519,160 B2
(45) Date of Patent: Dec. 13, 2016

(54) LASER LEVEL EYEWEAR APPARATUS

(71) Applicants: Michael Thomas Baker, Medford, WI (US); Dak Brandon Steiert, Edwards, CO (US)

(72) Inventors: Michael Thomas Baker, Medford, WI (US); Dak Brandon Steiert, Edwards, CO (US)

(73) Assignee: Michael Baker, Medford, WI (US)

( * ) Notice: Subject to any disclaimer, the term of this patent is extended or adjusted under 35 U.S.C. 154(b) by 249 days.

(21) Appl. No.: 14/520,216

(22) Filed: Oct. 21, 2014

(65) Prior Publication Data

US 2016/0109728 A1  Apr. 21, 2016

(51) Int. Cl.
| | |
|---|---|
| *G02B 11/00* | (2006.01) |
| *G02C 11/00* | (2006.01) |
| *G01C 9/12* | (2006.01) |
| *G01C 9/06* | (2006.01) |

(52) U.S. Cl.
CPC .................. *G02C 11/10* (2013.01); *G01C 9/12* (2013.01); *G01C 2009/066* (2013.01)

(58) Field of Classification Search
CPC ................................ G02C 11/00; G02C 11/10
See application file for complete search history.

(56) References Cited

U.S. PATENT DOCUMENTS

| | | | | |
|---|---|---|---|---|
| 2,068,103 A | * | 1/1937 | Harris ..................... | G02C 5/04 33/200 |
| 3,871,104 A | * | 3/1975 | Underhill, II ............ | G02C 9/00 33/262 |
| 4,426,138 A | * | 1/1984 | Sheridan ................ | G02C 11/00 351/111 |

FOREIGN PATENT DOCUMENTS

JP         2003329445 A     * 11/2003

* cited by examiner

*Primary Examiner* — Charlie Y Peng

(57) ABSTRACT

A laser level eyewear apparatus for providing a level indication visible by a wearer through the lenses comprises a pair of base glasses for wearing in front of a user's eyes having a frame, two modified lenses through which the wearer can look, a level projection assembly that is biased to return to and remain in an orientation to project a laser indication a level orientation through the lenses, and a battery that supplies electrical power to the level projection assembly. The frame defines a frame style similar to that in conventional eyeglasses, except that it not only holds the integrated, modified lenses in place over the eyes of one wearing the frame, its eyewire area is structured to surround the edges of the modified lenses so as to allow the laser from the level projection assembly to freely pass through the lenses.

20 Claims, 2 Drawing Sheets

LASER LEVEL EYEWEAR APPARATUS

DETAILED DESCRIPTION OF THE INVENTION

Figure 1:
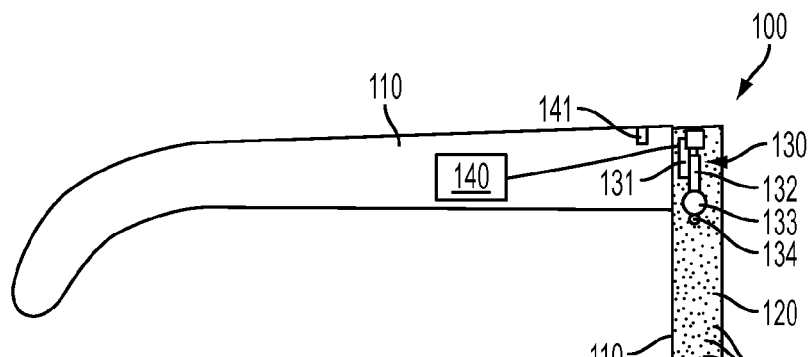
FIG. 1 is a side elevational view of a laser level eyewear apparatus built in accordance with an embodiment of the present invention.
Figure 2:
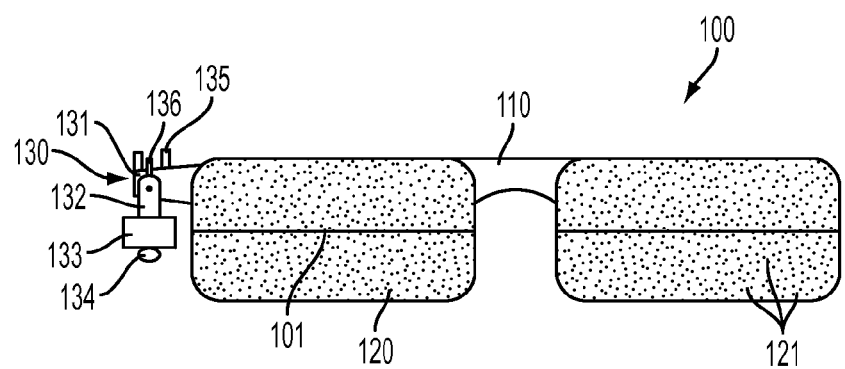
FIG. 2 is a front elevational view of a laser level eyewear apparatus built in accordance with an embodiment of the present invention.
Figure 3:
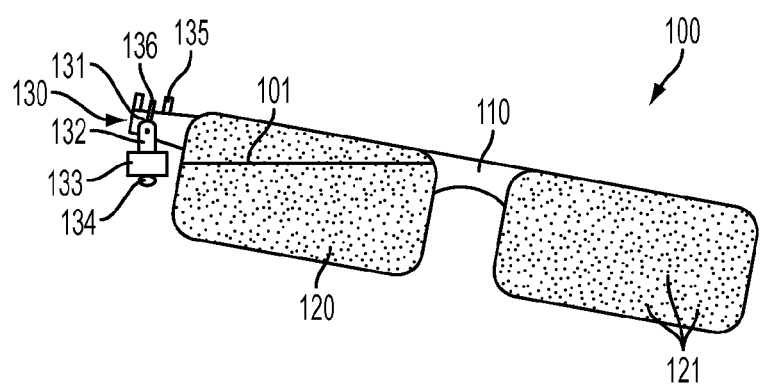
FIG. 3 is a front elevational view of a laser level eyewear apparatus built in accordance with an embodiment of the present invention in an angled position.

Referring now to the drawings and in particular FIGS. 1, 2, and 3, a laser level eyewear apparatus 100 built in the preferred embodiment is defined by a pair of base glasses for wearing in front of a user's eyes having a frame 110, two modified lenses 120 through which the wearer can look, a level projection assembly 130 that projects a laser through the lenses 120, and a battery 140 that supplies electrical power to the level projection assembly 130. The frame 110 defines a frame style similar to that in conventional eyeglasses, except that it not only holds the integrated, modified lenses 120 in place over the eyes of one wearing the frame 110, its eyewire area is structured to surround the edges of the modified lenses 120 so as to allow light 101 from the level projection assembly 130 to freely pass through the lenses 120. In another embodiment, the material of which the eyewire area is constructed of transparent material so as to allow light to freely pass from the level projection assembly 130 through the lenses 120.

Each of the modified lenses 120 define a substantially transparent lens body that includes a scattering medium suspended therein. In the preferred embodiment, the scattering medium defines a plurality of silver nanoparticles 121 distributed in the lenses 120. In an alternate embodiment, aluminum nanoparticles are employed. In any event, it is contemplated that the scattering medium would be comprised of particulate material that would not obstruct the ability of a user to see clearly through the lenses 120, but would scatter light from a laser beam generated by the level projection assembly 130, as discussed below, to make the laser beam visible.

The level projection assembly 130 is mounted to one side of the frame 110 and includes an assembly housing connected to a diode unit with a stabilizing member. The assembly housing a frame attachment section 131 fixedly attached to the side of the frame 110 and a pendulum section 132 pivotally attached at its proximal end to the frame attachment section 131, extending down therefrom.

The diode unit defines a laser diode 133 fixedly attached to the distal end of the pendulum section 132 and a balancing weight 134 attached to the laser diode 133. In the preferred embodiment, the balancing weight 134 is fixedly attached to the bottom of the laser diode 133, increasing the total weight of the diode unit and positioning the center of mass of the combined pendulum section 132 and diode unit farthest from the pivot where the pendulum section 132 is attached to the frame attachment section 131. The diode unit thereby operates as a plumb bob at the end of the pendulum section 132, always seeking the nadir with respect to gravity of the position of the frame 110 and thus its equilibrium position is always a plumb orientation.

Accordingly, whenever the frame 110 (and the fixedly attached frame attachment section 131) is displaced sideways so as to cause the combined pendulum section 132 and diode unit to swing about the pivot from equilibrium position, the combined pendulum section 132 and diode unit will be subject to a restoring force due to gravity that will swing it back about the pivot toward a new equilibrium position. In this regard, no matter the orientation of a wearer's head (and thus the orientation of the frame 110, frame attachment section 131), the combined pendulum section 132 and diode unit will find and return to the a plumb orientation through gravity.

The laser diode 133 is electrically connected to the battery 140 mounted on the frame 110. The flow of electricity from the battery 140 to the laser diode 133 is controlled by a manual actuator switch 141. The laser diode 133 is aligned such that when electricity is supplied to the laser diode 133, it produces a laser beam that exits the diode unit orthogonally with respect to the pendulum section 132 towards the frame 110 and into the lenses 120. As the pendulum section 132 and the diode unit always find and return to an equilibrium position defined by a plumb orientation, once they are in place in the equilibrium position, the laser projected from the laser diode 133 will be projected level (or horizontally) through the lens(es) 120. As illustrated in FIGS. 2 and 3, while the precise direction of the level projection of the laser beam will vary depending on the present orientation of the frame 110, it will always return to and rest in a direction that provides a level line independent of the head movement of the frame 110 (and thus the wearer of the frame 110).

Once the laser beam enters the lenses 120, the scattering medium distributed in the lenses 120 scatters light from the beam, making light from the laser beam passing through the lenses 120 visible.

The stabilizing member is defined as a pair of magnets 135 mounted on the fixedly attached frame attachment section 131. Because the pendulum section 132 is pivotally mounted to the frame attachment section 131 is a pendulum style manner, it is understood that when moving to a new equilibrium position, the combined pendulum section 132 and diode unit would in the abstract tend to oscillate about the new equilibrium position until air resistance eventually stopped it in the equilibrium position. To speed up the process of the combined pendulum section 132 and diode unit resting in the new equilibrium position, the magnets 135 are included generate a magnetic field around the proximal end of the pendulum section 132. In addition, a magnetic member 136 extends from the top of the proximal end of the pendulum section 132. The magnetic field generated by the magnets is used to damper the swinging of the combined pendulum section 132 and diode unit, allowing it to more quickly come to rest in its the new equilibrium position.

Figure 4:
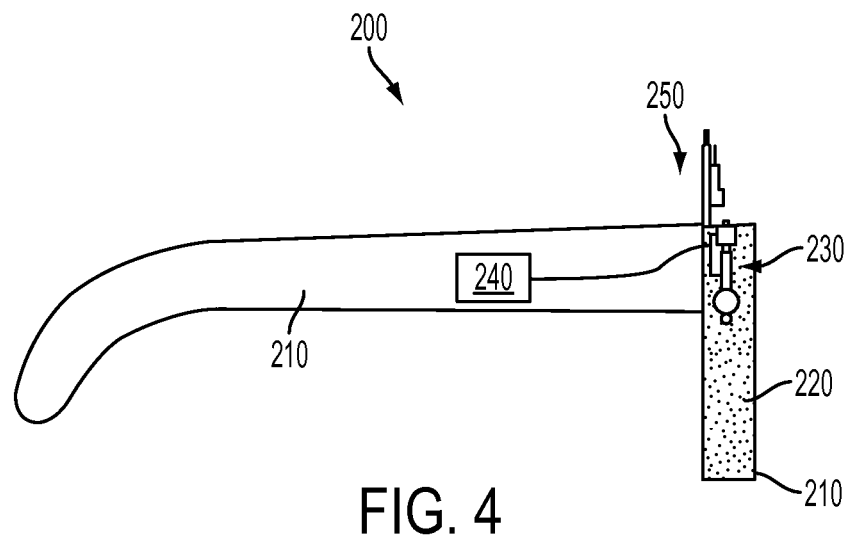
FIG. 4 is a side elevational view of a laser level eyewear apparatus built in accordance with an alternate embodiment of the present invention.
Figure 5:
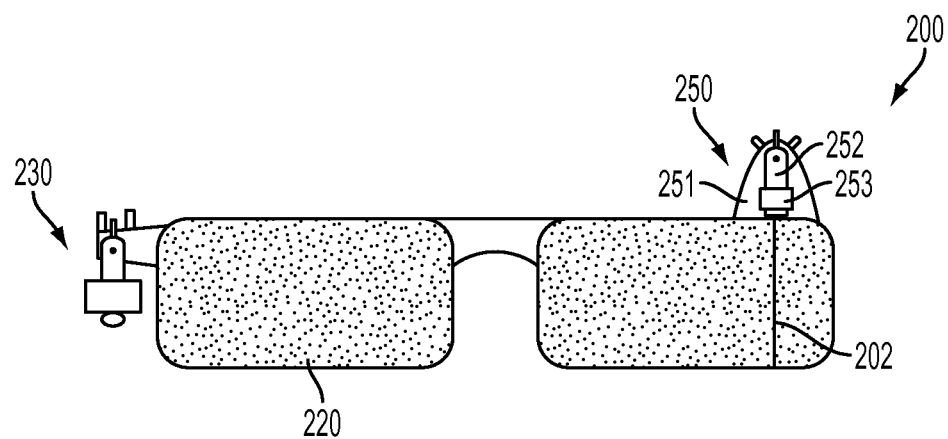
FIG. 5 is a front elevational view of a laser level eyewear apparatus built in accordance with an alternate embodiment of the present invention.

Referring now to FIGS. 4 and 5, in an alternate embodiment, a laser level eyewear apparatus 200 is defined by a pair of base glasses for wearing in front of a user's eyes having a frame 210, two modified lenses 220 through which the wearer can look, a first level projection assembly 230 that projects a laser in a level orientation through the lenses 220, a second level projection assembly 250 that projects a laser in a plumb orientation through the lenses 220, and a battery 240 that supplies electrical power to the level projection assembly 230. The laser level apparatus 200 is similar to the laser level apparatus illustrated in FIGS. 1-3, but includes the second level projection assembly 250 with its second laser diode 253 is aligned such that when electricity from the battery 240 is supplied to the second laser diode 253, it produces a laser beam 202 that exits the diode unit in parallel with respect to the pendulum section 252 pivotally mounted in the attachment section 251 towards the frame 210 and into the lens 220 above which it is mounted.

In another embodiment of a laser level eyewear apparatus in accordance with the present invention, instead of projecting a level line through a len(ses) of eyewear built in accordance with the present invention, such as glasses, with a laser mounted on the frame of the eyewear in a pendulum manner, a level line is produced by a transparent OLED display integrated into one or both of the lenses, which would light up and create a level line.

In another embodiment of a laser level eyewear apparatus in accordance with the present invention, instead of merely projecting a level line through a len(ses) of eyewear built in accordance with the present invention, the laser generated is reflected into the a wearer's eye through prism. It is understood, however, that such an embodiment would require the mediation of the power level of the laser so as to prevent discomfort and reduce dangers from directing a laser straight into an eye.

In another embodiment of a laser level eyewear apparatus in accordance with the present invention, instead of projecting a level line through a len(ses) of eyewear built in accordance with the present invention, with a laser mounted on the frame of the eyewear in a pendulum manner, a level indication is produced by an LCD or LED screen projector that creates image which is bounced into the eye via a prism mounted in front of the eye in a manner similar to what has been illustrated in US Patent Application 2013/0021658.

In another embodiment of a laser level eyewear apparatus in accordance with the present invention, instead of merely projecting a level line through a len(ses) of eyewear built in accordance with the present invention, a concave lens or mirror is employed to create a virtual image from a projector. This image is redirected to the eye by passing through the lens, with the lens being set up to refract the image towards the eye. In such an embodiment, additives are included in the glass that redirect only one wavelength of light (monochromatic), while letting other forms of light through.

In another embodiment of a laser level eyewear apparatus in accordance with the present invention, instead merely of projecting a level line through a len(ses) of eyewear built in accordance with the present invention, the lens itself can be partially reflective, particularly to the wavelength of light of an LED or laser creating a horizontal, adjustable line. The line can be projected at the lens, and the lens is curved such that it acts as a spherical mirror, with the light source at its focus. The reflected line will appear as a virtual line appearing to be at infinity, keeping it aligned properly and making it appear as though it is actually projected on a wall or any surface in front of the wearer.

In another embodiment of a laser level eyewear apparatus in accordance with the present invention, instead of projecting a level line through a len(ses) of eyewear built in accordance with the present invention, an LCD layer might be placed on the glasses that can create a non-light up line.

In another embodiment of a laser level eyewear apparatus in accordance with the present invention, instead of projecting a level line through a len(ses) of eyewear built in accordance with the present invention, an array of small laser diodes placed in solid state at multiple angles, with a chip connected thereto to enable them to be alternately activated to produce a variable-angle line.

In any such alternate embodiment, it is contemplated that the level determination and/or the projection may be made with an integrated pendulum, a spirit level, or other known level determining devices used in isolation or in concert. For example, (1) a servo motor may be attached to an inclinometer or gyroscope sensor to level a laser diode, or direct a mirror to level the laser line, (2) a muscle wire actuator may provide the actuation to level the mirror or diode assembly, (3) a MEMS powered micromirror array might reflect the laser beam to level, and/or (4) it an LCD or LED based projector projects a virtual image through a prism into the eye, the image being projected can be virtually leveled via the readout of a gyroscope or inclinometer.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A laser level eyewear apparatus for providing an integrated level indication, comprising:
    a viewing structure defined as at least one of a lens and an apparatus for projecting light into an eye of a user;
    a wearable frame member configured to hold the viewing structure;
    a power source integrated with said wearable frame member; and
    a level projection assembly integral with the wearable frame member and connected to said power source, wherein the level projection assembly is configured to produce a line of light visible through the viewing structure at a level orientation when supplied electricity from the power source.

2. The laser level eyewear apparatus for providing the integrated level indication of claim 1, wherein the viewing structure defines a lens.

3. The laser level eyewear apparatus for providing the integrated level indication of claim 2, wherein the lens includes a scattering medium suspended therein.

4. The laser level eyewear apparatus for providing the integrated level indication of claim 3, wherein the scatting medium is defined as a plurality of silver nanoparticles.

5. The laser level eyewear apparatus for providing the integrated level indication of claim 2, wherein the wearable frame member defines a modified eyeglasses frame.

6. The laser level eyewear apparatus for providing the integrated level indication of claim 2, wherein the modified eyeglasses frame includes an eyewire area structured with respect to each of the at least one lens to enable light to enter the side of the lens unscattered.

7. The laser level eyewear apparatus for providing the integrated level indication of claim 6, wherein the viewing structure defines two discrete lenses arranged on the same plane.

8. The laser level eyewear apparatus for providing the integrated level indication of claim 7, wherein the modified eyeglasses frame includes an eyewire area structured with respect to both lenses to enable light to enter the side of each lens, sequentially, unscattered.

9. The laser level eyewear apparatus for providing the integrated level indication of claim 6, wherein the eyewire area is structured with respect to each of the at least one lens to only surround the edges of the at least one lens.

10. The laser level eyewear apparatus for providing the integrated level indication of claim 1, wherein the level projection assembly defines an assembly housing mounted on the wearable frame member and connected to a diode unit, said assembly housing configured to bias the diode unit to an equilibrium position defined by a plumb orientation and said diode unit configuring the level projection assembly to produce a line of light visible through the viewing structure at a level orientation.

11. The laser level eyewear apparatus for providing the integrated level indication of claim 10, wherein the assembly housing includes a stabilizing member attached thereto, said stabilizing member adapting the diode unit the resist oscillation when moving from a position out of equilibrium to its equilibrium position.

12. The laser level eyewear apparatus for providing the integrated level indication of claim 10, wherein said assembly housing is configured to bias the diode unit to an equilibrium position defined by a plumb orientation solely through ambient gravitational force.

13. A laser level eyewear apparatus for providing an integrated level indication, comprising:
   a wearable frame member configured to be worn by a user and hold at least one integrated lens in front of the eye of the user;
   wherein the at least one lens defines a substantially transparent viewing body that includes a scattering medium suspended therein;
   a power source integrated with said wearable frame member; and
   a level projection assembly integral with the wearable frame member and connected to said power source, wherein the level projection assembly is configured to produce a line of light visible through the at least one lens at a level orientation when supplied electricity from the power source, said line of light visible due to being scattered by the scatting medium.

14. The laser level eyewear apparatus for providing the integrated level indication of claim 13, wherein the scatting medium is defined as a plurality of silver nanoparticles.

15. The laser level eyewear apparatus for providing the integrated level indication of claim 13, wherein the wearable frame member includes two discrete lenses arranged on the same plane.

16. The laser level eyewear apparatus for providing the integrated level indication of claim 13, wherein the wearable frame includes an eyewire area structured with respect to each of the at least one lens to enable light to enter the side of the lens unscattered.

17. The laser level eyewear apparatus for providing the integrated level indication of claim 13, wherein the level projection assembly defines an assembly housing connected to a diode unit and mounted on the wearable frame member such that the diode unit is disposed on the side of the wearable frame member, said assembly housing configured to bias the diode unit to an equilibrium position defined by a plumb orientation solely through ambient gravitational force and said diode unit configuring the level projection assembly to produce a line of light visible through the at least one lens at a level orientation.

18. The laser level eyewear apparatus for providing the integrated level indication of claim 17, wherein the assembly housing includes a stabilizing member attached thereto, said stabilizing member adapting the diode unit the resist oscillation when moving from a position out of equilibrium to its equilibrium position.

19. The laser level eyewear apparatus for providing the integrated level indication of claim 13, wherein: the assembly housing defines a frame attachment section fixedly attached to the side of the frame and a pendulum section pivotally attached at its proximal end to the frame attachment section, extending down therefrom; the diode unit is attached to the distal end of the pendulum section and includes a laser diode and a weighted member, said weighted member increasing the total weight of the diode unit and positioning the center of mass of the combined pendulum section and diode unit farthest from the pivot where the pendulum section is attached to the attachment section; and said laser diode is aligned such that when electrical power is supplied thereto, it produces a laser beam that exits the diode unit orthogonally with respect to the pendulum section.

20. A laser level eyewear apparatus for providing an integrated level indication, comprising:
   a wearable frame member configured to be worn by a user and hold at least one integrated lens in front of the eye of the wearer;
   wherein the at least one lens defines a substantially transparent viewing body that includes a scattering medium suspended therein;
   a power source integrated with said wearable frame member;
   a first level projection assembly integral with the wearable frame member and connected to said power source, wherein the first level projection assembly is configured to produce a first line of light visible through the at least one lens at a level orientation when supplied electricity from the power source, said first line of light visible due to being scattered by the scatting medium; and
   a second level projection assembly integral with the wearable frame member and connected to said power source, wherein the second level projection assembly is configured to produce a second line of light visible through the at least one lens at a plumb orientation when supplied electricity from the power source, said second line of light visible due to being scattered by the scatting medium.

* * * * *